United States Patent
Neshmonin et al.

(10) Patent No.: US 9,503,537 B1
(45) Date of Patent: Nov. 22, 2016

(54) DEVICE TRACKER FOR USER ACCOUNTS

(71) Applicant: Amazon Technologies, Inc., Reno, NV (US)

(72) Inventors: Alex Neshmonin, Seattle, WA (US); Chesley Bernard Coughlin, Issaquah, WA (US); Anton Fedorenko, Bellevue, WA (US); Siddharth Jacob Thazhathu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 182 days.

(21) Appl. No.: 13/859,099

(22) Filed: Apr. 9, 2013

(51) Int. Cl.
*G06F 15/173* (2006.01)
*H04L 29/08* (2006.01)
*G06F 17/30* (2006.01)

(52) U.S. Cl.
CPC ......... *H04L 67/22* (2013.01); *G06F 17/30867* (2013.01); *H04L 67/306* (2013.01)

(58) Field of Classification Search
CPC    H04L 67/22; H04L 67/306; G06F 17/30867
USPC ................................................. 709/220, 224
See application file for complete search history.

(56) References Cited

U.S. PATENT DOCUMENTS

| | | | | |
|---|---|---|---|---|
| 9,288,118 | B1 * | 3/2016 | Pattan ................... | H04L 41/28 |
| 2002/0173911 | A1 * | 11/2002 | Brunet et al. .................... | 702/1 |
| 2009/0260064 | A1 * | 10/2009 | McDowell et al. ............... | 726/4 |
| 2010/0228625 | A1 * | 9/2010 | Priyadarshan ..... | G06Q 30/0251 705/14.49 |
| 2011/0167440 | A1 * | 7/2011 | Greenfield ........... | H04L 63/102 725/25 |
| 2012/0102008 | A1 * | 4/2012 | Kaariainen ........ | G06Q 30/0201 707/705 |
| 2012/0190350 | A1 * | 7/2012 | Ratnakar ................... | 455/414.3 |
| 2013/0246173 | A1 * | 9/2013 | Berkley ................ | G06Q 30/02 705/14.53 |
| 2014/0207835 | A1 * | 7/2014 | Jellick et al. ................. | 707/827 |
| 2014/0258481 | A1 * | 9/2014 | Lundell ......................... | 709/222 |

\* cited by examiner

*Primary Examiner* — Wing F Chan
*Assistant Examiner* — Joseph Maniwang
(74) *Attorney, Agent, or Firm* — Thomas Horstemeyer, LLP (57) ABSTRACT

Disclosed are various embodiments for associating clients with user accounts using a unique device identifier. A plurality of identifiers is provided by a client to a device tracker. The device tracker determines if one of the plurality of identifiers matches an identifiers previously stored in association with a user account. If no association exists, the device tracker determines if the client is currently logged into a user account and associates the client with the user account in response to determining that the client is logged into the user account. If the client is not logged into a user account, then the device tracker stores the unique device identifier for the client and waits for the client to log into a user account in the future.

20 Claims, 6 Drawing Sheets

DEVICE TRACKER FOR USER ACCOUNTS

BACKGROUND

Users of network sites, such as electronic commerce applications or online communities, often have user accounts for each network site. Users visit these network sites using a plurality of client applications executing in a plurality of client computing devices. The network site may further identify a user of a client application after a user has logged into their user account.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure involves tracking user devices and associating them with a user account maintained by an content server. Users of a client application on a client device interact with an advertisement within the client application. In response to the interaction, the client application spawns a browser that loads a network page. If the user logs in to the network page, the client device is associated with the user account. If the user chooses not to login to the network page, information regarding the client device is stored so that the client may be associated with the user account at a later time. In the following discussion, a general description of the system and its components is provided, followed by a discussion of the operation of the same.

Figure 1:
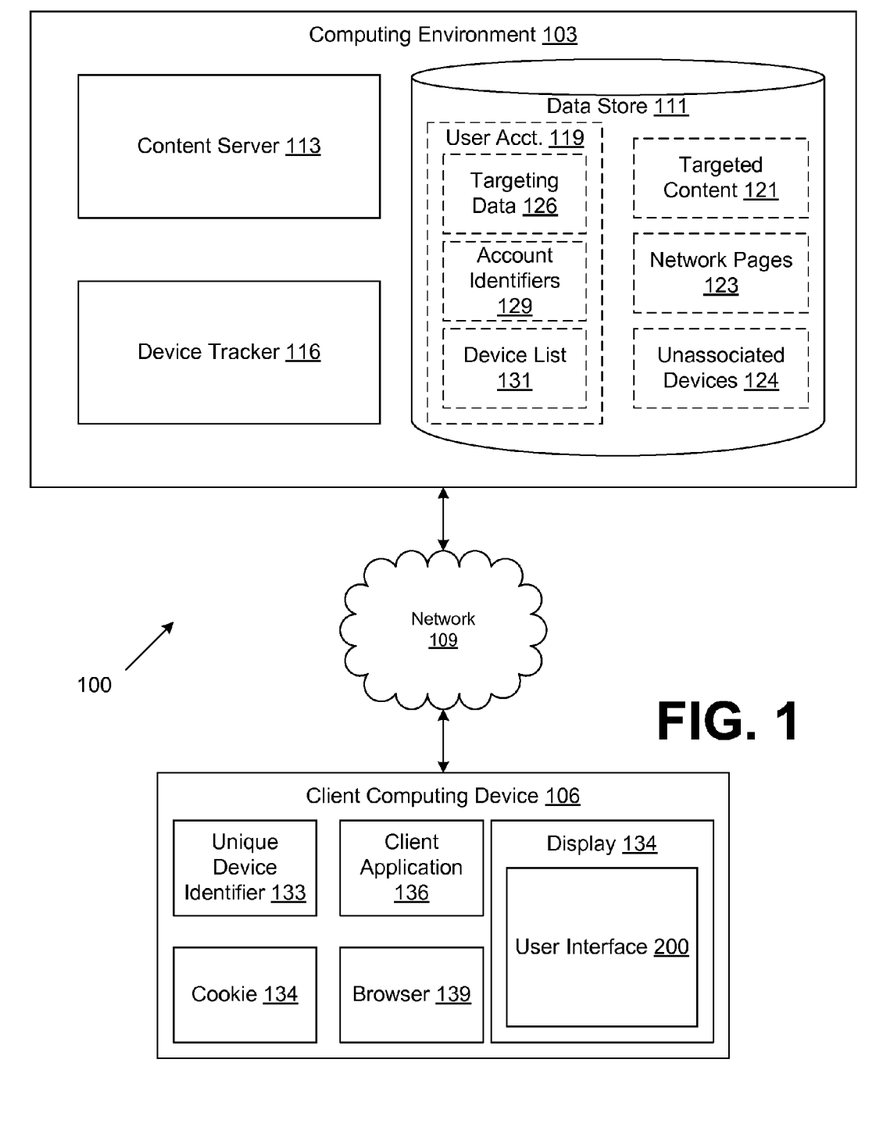
FIG. 1 is a drawing of a networked environment according to various embodiments of the present disclosure.

With reference to FIG. 1, shown is a networked environment 100 according to various embodiments. The networked environment 100 includes a computing environment 103, and a client computing device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 111 that is accessible to the computing environment 103. The data store 111 may be representative of a plurality of data stores 111 as can be appreciated. The data stored in the data store 111, for example, is associated with the operation of the various applications and/or functional entities described below.

The components executed on the computing environment 103, for example, include a content server 113, a device tracker 116, and other applications, services, processes, systems, engines, or functionality not discussed in detail herein. The content server 113 is meant to provide content to client computing devices 106 based upon data stored in the data store 111, as will be further described herein. The device tracker 116 is meant to track client computing devices 106 that may or not be associated with one or more users, as will be further described herein. The device tracker 116 may be used in conjunction with the content server 113, as will be described further herein for illustrative purposes. However, it is understood that the device tracker 116 may be used in conjunction with any one of a number of applications that require the functionality of the device tracker 116.

The data stored in the data store 111 includes, for example, user accounts 119, targeted content 121, network pages 123, unassociated devices 124 and potentially other data or content.

User accounts 119 represent account data for one or more users associated with the content server 113. User accounts 119 may further comprise targeting data 126, one or more account identifiers 129, and a device list 131.

Targeting data 126 is data used for selecting personalized or targeted content 121 tailored to an individual user. Targeting data 126 may include such data as demographic data, purchase or order history data, and personal preferences indicated by a user.

Account identifiers 129 comprise tokens or similar data that may be used to uniquely identify a user account 119 from a plurality of user accounts 119. Account identifiers 129 may comprise, for example, user names, user identification numbers, or similar data.

A device list 131 comprises of a list or set of persistent device identifiers such as unique device identifiers 133 and cookies 134 representing a set of client computing devices 106 associated with the user account 119. Unique device identifiers 133 and cookies 134 are added to the device list 131 when a user accesses a network page 123 or similar resource or object while logged in to their user account 119. Unique device identifiers 133 and cookies 134 may also be removed from the device list 131 as needed to reflect the transfer of client computing devices 106 between one or more user accounts 119.

Targeted content 121 comprises content served by the content server 113 in response to user requests, such as advertisements, product recommendations, promotions, or other such content that may appeal to a particular user of a client computing device 106. Targeted content 121 may often be embedded within network pages 123 requested by a client computing device 106. However, targeted content 121 may also be served as standalone content or provided in response to other types of requests.

Network pages 123 comprise web pages or other types of network content that are provided to client computing devices 106 in response to various requests to applications, such as the content server 113, within the computing environment 103. A network page 123 may include code that dynamically generates network pages when requested with the client computing device 106. The code may be written in any suitable programming language such as, for example, PHP, Perl, Objective C, Java, Ruby, etc. Also, the network pages 123 may include code configured to be executed or interpreted within the client computing device 106 in order to facilitate dynamic rendering of the network page 123. Such code may be referred to as an executable and may be written in any suitable programming language such as, for example, JavaScript, Java or other languages. Network pages 123 may also include static elements that may be expressed, for example, in hypertext markup language (HTML), extensible markup language (XML), and/or any other language suitable for creating network pages 119.

Unassociated devices 124 comprise the client computing devices 106 that have been identified by the device tracker 116 but have not yet been associated with a user account 119. For example, a client computing device 106 may have visited a network page 123 that includes targeted content 121 provided by the content server 113. However, the user of the client computing device 106 may not have previously logged in to a user account 119. Therefore, no association has yet to be created between the client computing device 106 and any user account 119.

The client computing device 106 is representative of a plurality of client devices that may be coupled to the network 109. The client computing device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client computing device 106 may include a display 134. The display 134 may comprise, for example, one or more devices such as liquid crystal display (LCD) displays, gas plasma-based flat panel displays, organic light emitting diode (OLED) displays, LCD projectors, or other types of display devices, etc.

The client computing device 106 may include a unique device identifier 133 that uniquely and persistently identifies the client computing device 106 from other client computing devices. The unique device identifier 133 may comprise a software or operating system generated identifier. As an illustrative and non-limiting example, a software or operating system generated identifier may comprise the unique device identifier (UUID) or advertising identifier (AdID) found in smartphones running iOS® or Android® operating systems that continue to identify a particular device unless explicitly reset by a user. Alternatively, the unique device identifier 133 could be a hardware identifier. As an illustrative and non-limiting example, a hardware identifier may comprise a device serial number, a media access control (MAC) address for a network card, or a similar identifier. Such hardware identifiers persistently identify the client computing device 106 until the hardware component is replaced. While the UUID 133 may be accessible to one or more applications executing in the client computing device 106, such as one or more client applications 136, the UUID 133 is generally inaccessible to a network browser, web browser, or similar application represented as the browser 139.

The client computing device 106 may also include one or more cookies 134 placed by the device tracker 116 that uniquely and persistently identify the client computing device 106. Generally, applications such as the browser 139 have access to cookies 134 placed be the device tracker 116, while other client applications 136 may not. In some embodiments of the present disclosure, there may be a one-to-one relationship between each cookie 134 and the client computing device 106, such that each cookie 134 identifies a single client computing device 106 for the device tracker 116 and each client computing device 106 is identified to the device tracker 116 by a single cookie 134.

The client computing device 106 may be configured to execute various applications such as a client application 136, a browser 139 and/or other applications. The client application 136 may be executed in a client computing device 106, for example, to access network content served up by the computing environment 103 and/or other servers, thereby rendering a user interface 200 on a display 134. The client application 136 may further provide advertisements 121 served by the content server 113 to the user of the client computing device 106. The browser 139 may be executed in a client computing device 106, for example, to access network content such as network pages 123 provided by the computing environment 103, thereby by rendering the network pages 123 as a user interface 200 on a display 134. The client computing device 106 may be configured to execute applications beyond the client application 136 such as, for example, email applications, social networking applications, word processors, spreadsheets, and/or other applications.

Next, a general description of the operation of the various components of the networked environment 100 is provided. To begin, it is assumed that a user is interacting with a client application 136 that provides advertisements 121 to the user. Such a client application 136 may include an advertising supported application such as a free or trial version of the client application 136.

The client application 136 requests one or more items of targeted content 121 from the content server 113. As a portion of this request, the client application 136 includes the unique device identifier 133 associated with the client computing device 106. Upon receiving the request for one or more items of targeted content 121, the content server 113 passes the unique device identifier 133 included with the request to the device tracker 116.

The device tracer 116 compares the unique device identifier 133 included with the request with the device list 131 of one or more user accounts 119 to determine if the client computing device 106 is associated with a particular user account 119. If the unique device identifier 136 matches a unique device identifier 136 stored in the device list 131 of a use account 119, then the device tracker 116 returns the corresponding user account 119 to the content server 113. If the unique device identifier 136 does not match with a unique device identifier 133 stored in the device list 131 of any of the user accounts 119, the unique device identifier 133 is compared to the unique device identifiers 133 stored in the list of unassociated devices 124. If the unique device identifier 133 does not appear in the list of unassociated devices 124, then the unique identifier 133 is added to the unassociated devices 124. Further, in the event that the unique device identifier 133 does not match with a unique device identifier 133 associated with a user account 119, the device tracker 116 places a cookie 134 on the client computing device 106 that is accessible to the browser 139.

If the device tracker 116 returns a user account 119 to the content server 113, then the content server 113 selects one or more advertisements 121 targeted for the user account 119. The content server 113 determines the advertisements 121 that are most likely to be relevant or effective based upon an analysis of the targeting data 126 of the user account 119.

If the device tracker 116 does not return a user account 119, then the content server 113 selects one or more items of targeted content 121 based upon other approaches. For example, some embodiments of the present disclosure may select one or more items of targeted content 121 at random to return to the client application 136. In an alternative example, other embodiments may select one or more items of targeted content 121 that have been selected the least. In another embodiment of the present disclosure, preference may instead be given to particular targeted content 121, such as advertisements for which the advertiser has paid the most money for advertising rights. Further, other embodiments may use other approaches to select one or more items of targeted content 121 when no user account 119 has been identified as associated with the client computing device 106.

Subsequent to the client application 136 receiving one or more items of targeted content 121 from the content server 113, a user may interact with one of the returned pieces of targeted content 121 to open a browser 139. The browser 139 requests a network page 123 related to the targeted content 121 received from the content server 113. Such a network page 123 may comprise, for example, a special network page 123 returned by the content server 113, or a network page 123 provided by a third-party site. Included with the request, if available, is a cookie 134 previously placed on the client computing device 106.

The requested network page 123 may include an option or ability for a user to login to a user account 119 related to the content server 113 or the network page 123. Should the user choose to login to his or her user account 119, the content server 113 will pass the unique device identifier 133, the cookie 134, and appropriate account identifiers 129 to the device tracker 116, which associates the client computing device 106 with the user account 119 for future reference.

Figure 2A:
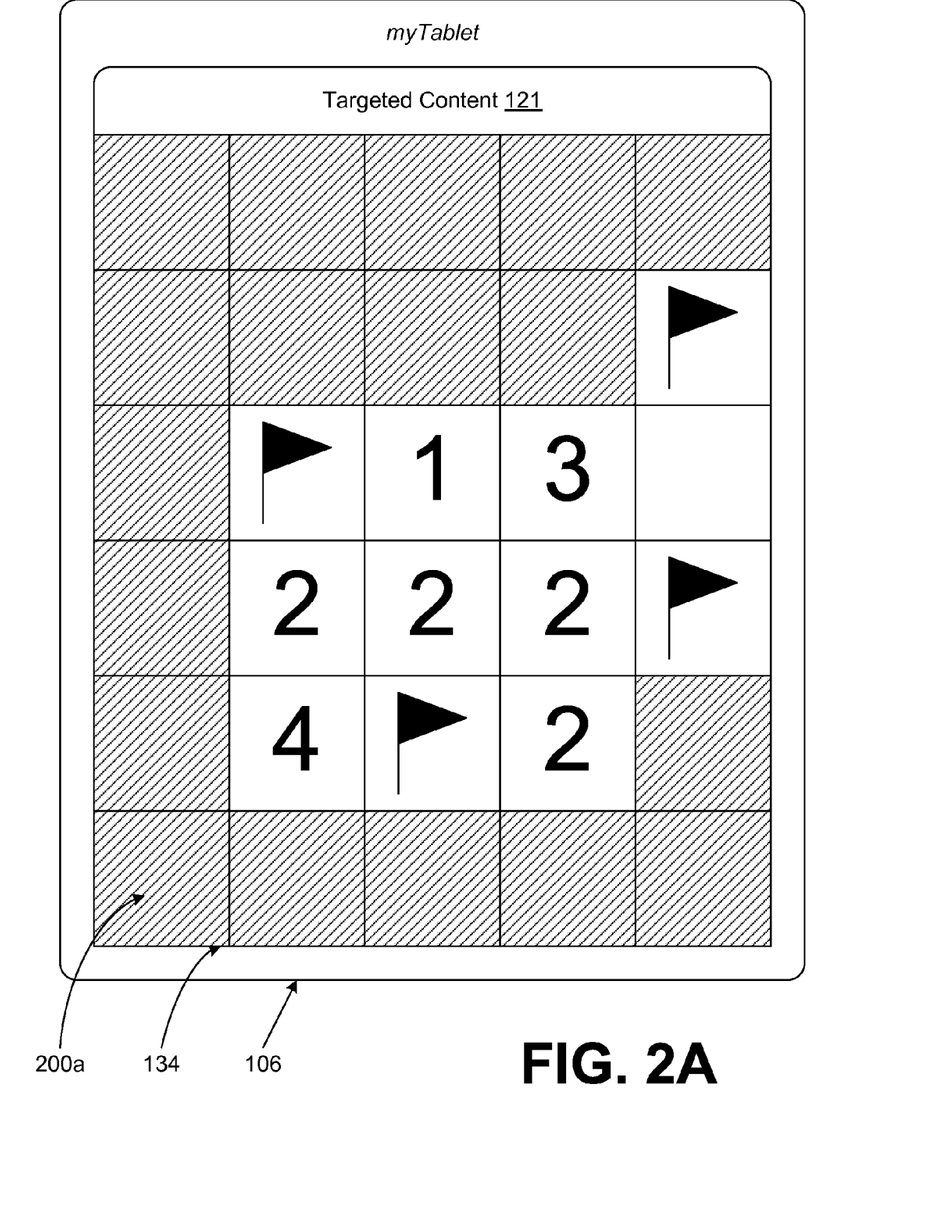
FIGS. 2A-B are drawings of an example of a user interface rendered by a client in the networked environment of FIG. 1 according to various embodiments of the present disclosure.

Referring next to FIG. 2A, shown is an example of a user interface 200, denoted herein as 200a, of a client application 136 (FIG. 1) executing in a client computing device 106. In the illustration of FIG. 2A, the client computing device 106 comprises a tablet or similar computing device, wherein the user interface 200a of the client application 136 is coextensive with the display 134.

The client application 136, portrayed as a Minesweeper style game for illustrative purposes, directs the client computing device 106 to render a user interface 200a on the display 134. The client application 136 further provides one or more items of targeted content 121, such as an advertisement, within the user interface 200a. Such targeted content 121 is provided to the client application 136 by the content server 113 (FIG. 1) in response to requests for targeted content 121 from the client application 136. As previously described, such targeted content 121 may be generic or may be personalized or otherwise targeted to the user account 119 associated with the client computing device 106. Should the user of the client application 136 select or otherwise interact with the targeted content 121 as illustrated, a browser 139 will spawn and load a network page 123 for the advertised goods or services.

Figure 2B:
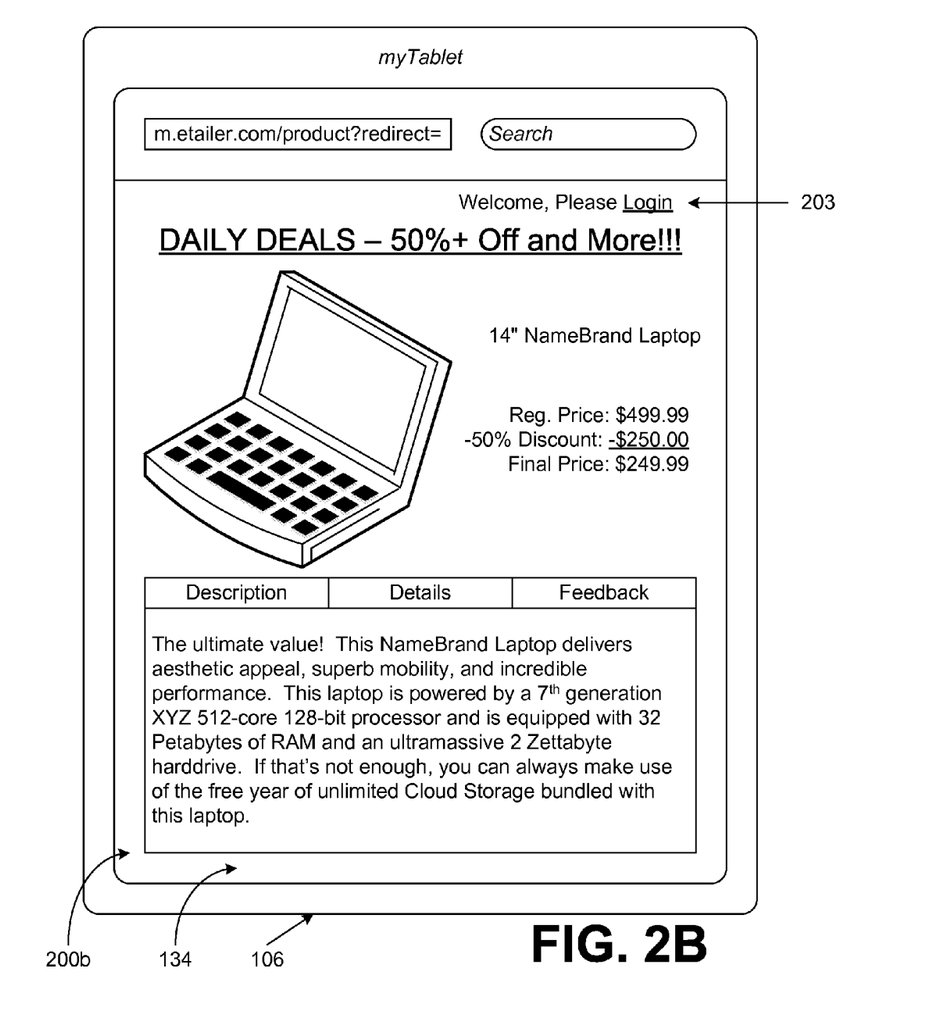

Turning now to FIG. 2B, shown is an example of a user interface 200, denoted herein as user interface 200b, of a browser 139 (FIG. 1) executing in a client computing device 106. In the illustration of FIG. 2A, the client computing device 106 comprises a tablet or similar computing device, wherein the user interface 200b of the browser 139 is coextensive with the display 134.

Here, it is assumed that a user has selected or interacted with targeted content 121 (FIG. 2A), such as an advertisement, rendered as a portion of the user interface 200a (FIG. 2A) of the client application 136 (FIG. 2A). In response, the client application 136 has spawned an instance of a native browser 139 displaying a network page 123 (FIG. 1) associated with the advertised item. As part of the network page 123, the user may be provided with a prompt 203 to login to his or her user account 119. Should the user choose to login to his or her user account 119, the device tracker 116 will associate the client computing device 106 with the user account 119.

Figure 3:
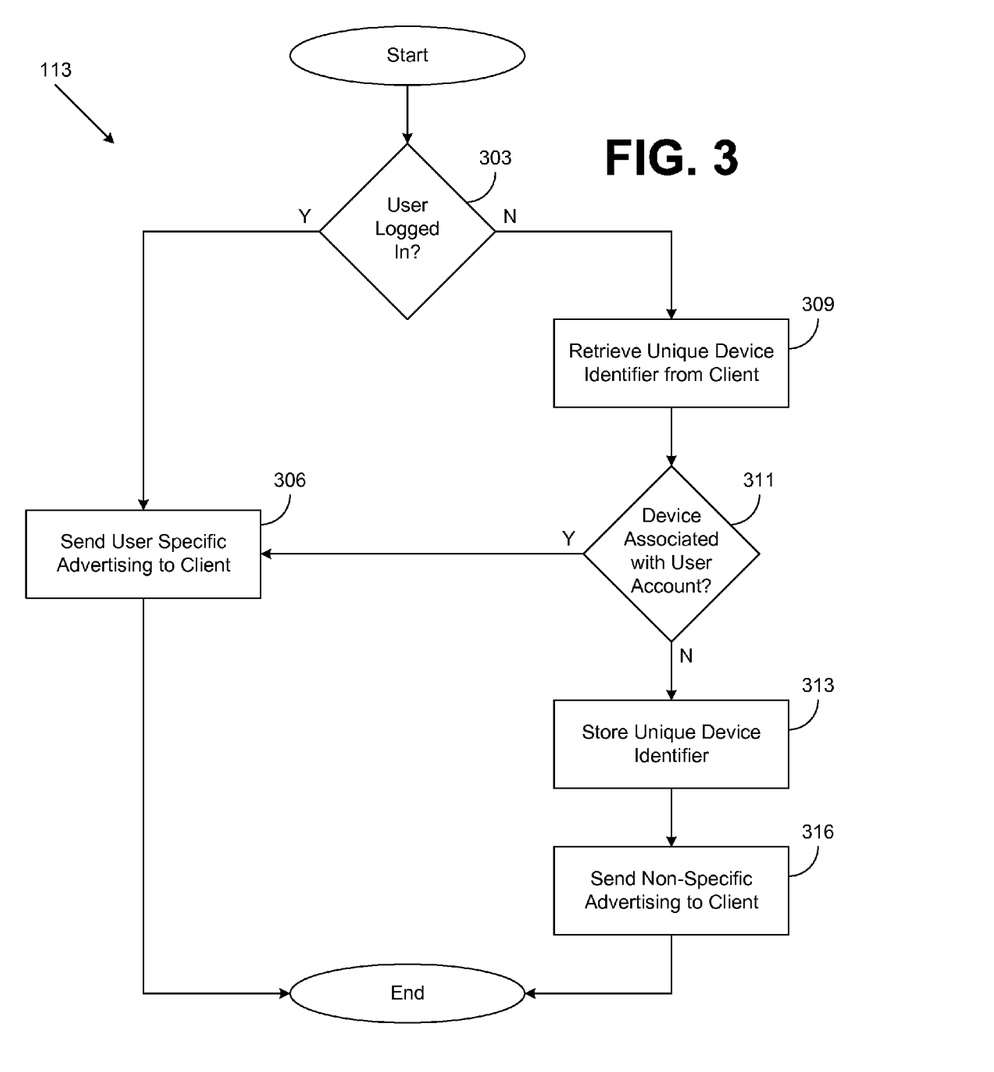
FIG. 3 is a flow chart illustrating an example of functionality implemented as portions of an content server executed in a computing environment in the networked environment of FIG. 1 according to various embodiments of the present disclosure.

Referring next to FIG. 3, shown is a flowchart that provides one example of the operation of a portion of the content server 113 according to various embodiments. It is understood that the flowchart of FIG. 3 provides merely an example of the many different types of functional arrangements that may be employed to implement the operation of the portion of the content server 113 as described herein. As an alternative, the flowchart of FIG. 3 may be viewed as depicting an example of steps of a method implemented in the computing environment 103 (FIG. 1) according to one or more embodiments. It is assumed that a client application 136 (FIG. 1) has requested one or more items of targeted content 121 (FIG. 1) from the content server 113.

Beginning with box 303, the content server 113 checks to see if the user is currently or has previously logged into a user account 119 (FIG. 1) using a browser 139. Such a determination may be made by checking for the presence of a session identifier, cookie 134 (FIG. 1), or similar token indicating that a user is currently logged into a user account 119 or has previously logged into a user account 119 using the browser 139 executing on the client computing device 106 (FIG. 1). If the user is currently logged into or has previously logged into a user account 119, then execution proceeds to box 306. Otherwise, execution proceeds to box 309.

Proceeding to box 306, the content server 113 queries the targeting data 126 associated with the user account 119 to determine preferences for the user. The content server 113 then selects one or more items of targeted content 121 that are deemed to be most relevant for a particular user in light of the targeting data 126 of the user account 119. Execution then ends.

Proceeding to box 309, the content server 113 retrieves the unique device identifier 133 from the client computing device 106. In some embodiments of the present disclosure, the unique device identifier 133 may be included in the request from the client computing device 106 for one or more items of targeted content 121, in which case the content server 113 parses the request to retrieve the unique device identifier 133. In other embodiments of the present disclosure, the content server 113 may separately query the client computing device 106 for the unique device identifier 133. Execution then proceeds to box 311.

In box 311, the content server 113 passes the unique device identifier 133 to the device tracker 116. As previously described above and further described herein, the device tracker 116 determines if the unique device identifier 133 is associated with a particular user account 119 and returns the result. If the device tracker 116 determines that the unique device identifier 133 is associated with a user account 119, then the device tracker 116 returns one or more account identifiers 129 to the content server and execution proceeds to box 306. If the device tracker 116 determines that no association between a user account 119 and the unique device identifier 133 exists, then the device tracker 116 returns an empty set of account identifiers 129 and execution proceeds to box 313.

In box 313, the content server 113 instructs the device tracker 116 to store the unique device identifier 133 in case a user logs into a user account 119 from the client computing device 106 with that unique device identifier 133 in the future. Execution then proceeds to box 316.

In box 316, the content server selects one or more non-user specific items of targeted content 121 to return to the client application 136. Non-user specific targeted content may be selected by any one of a number of approaches. For example, some embodiments of the present disclosure may select one or more items of targeted content 121 at random to return to the client application 136. In an alternative example, other embodiments may select targeted content 121 that has been selected the least. In another embodiment of the present disclosure, preference may instead be given to targeted content 121 which may generate the most revenue. Further, other embodiments may use other approaches to select targeted content 121 when no user account 119 has been identified as associated with the client computing device 106. After the non-specific targeted content 121 is selected, it is sent to the client application 136 and execution subsequently ends.

Figure 4:
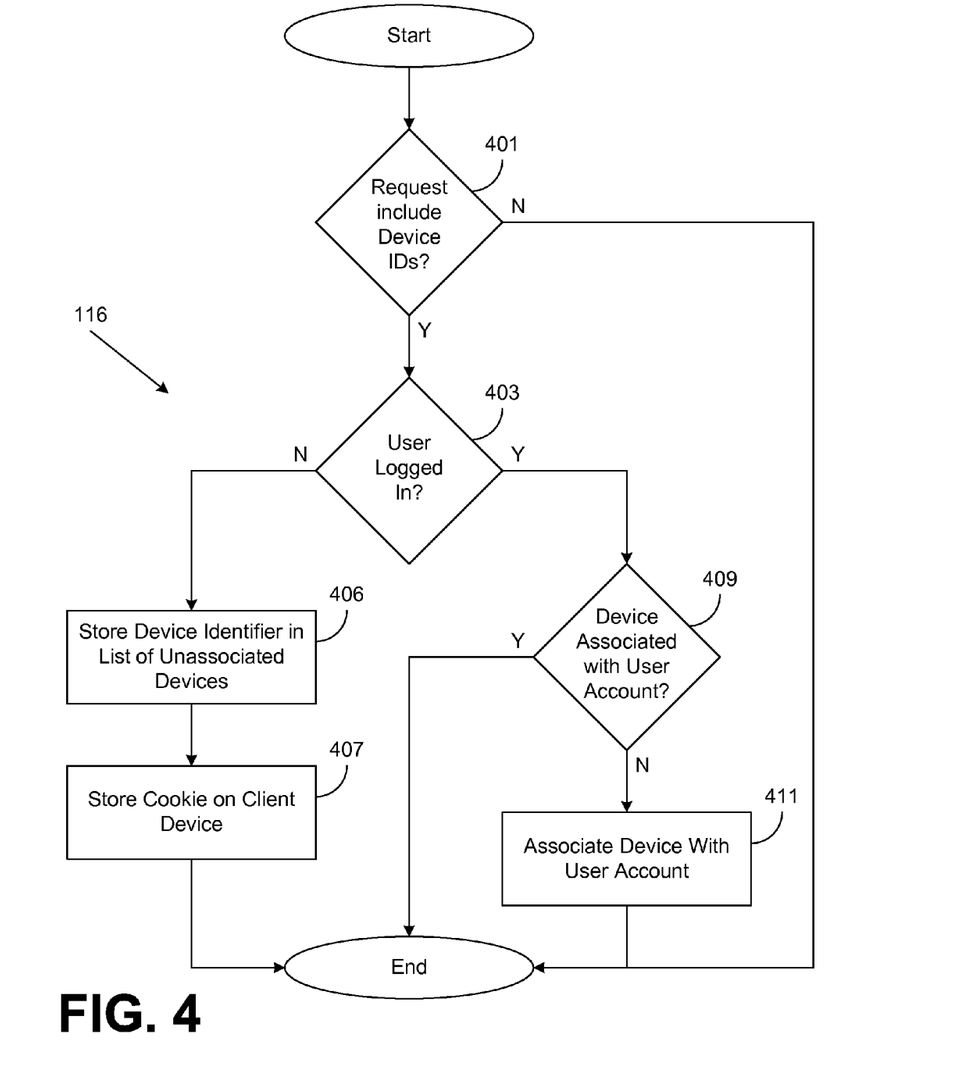
FIG. 4 is a flowchart illustrating an example of functionality implemented as portions of a device tracker executed in a computing environment in the networked environment of FIG. 1 according to various embodiments of the present disclosure.

Referring next to FIG. 4, shown is a flowchart that provides one example of the operation of a portion of the device tracker 116 according to various embodiments. It is understood that the flowchart of FIG. 4 provides merely an example of the many different types of functional arrangements that may be employed to implement the operation of the portion of the device tracker 116 as described herein. As an alternative, the flowchart of FIG. 4 may be viewed as depicting an example of steps of a method implemented in the computing environment 103 (FIG. 1) according to one or more embodiments. It is assumed that the device tracker 116 has received a request from the content server 113 (FIG. 1) to link or associated a client computing device 106 (FIG. 1) with a user account 119 (FIG. 1).

Beginning with box 401, the device tracker determines if the request includes one or more unique device identifiers (UDID) 133 (FIG. 1) and/or a cookie 134 (FIG. 1) previously placed on the client computing device 106.

Proceeding to box 403, the device tracker 116 determines if the user of the client computing device 106 is currently logged into a user account 119 or has previously logged into a user account 119. To make this determination, the device tracker 116 may query the client application 136 (FIG. 1) or the browser 139 (FIG. 1) to search for a session identifier, a cookie, or a similar token indicating a connection between the client computing device 106 and a user account 119. If no such token is found, the device tracker 116 determines that the client computing device 106 is not currently logged into a user account 119 and has not previously logged into a user account 119. Execution then proceeds to box 406. If such a token is found, then execution proceeds to box 409.

Proceeding to box 406, the device tracker 116 stores the unique device identifier 133 (FIG. 1) in a list of unassociated devices 124 (FIG. 1).

Referring next to box 407, the device tracker 116 stores a cookie 134 on the client computing device 106. The cookie will act as a UDID 133 in the event that the user subsequently uses a browser 139 executing on the client computing device 106 to request additional network content. Execution subsequently ends.

Moving on to box 409, the device tracker 116 determines if the client computing device 106 has already been associated with a user account 119. The device tracker makes the determination by comparing the unique device identifier 133 of the client computing device 106 with a device list 131 (FIG. 1) associated with a user account 119. If the device tracker determines that the client computing device 106 is associated with a user account 119, then execution ends. Otherwise, execution proceeds to box 411.

Referring next to box 411, the device tracker 116 stores the unique device identifier 133 in the device list 131 of the user account 119 to associate the client computing device 106 with the user account 119. Execution subsequently ends.

Figure 5:
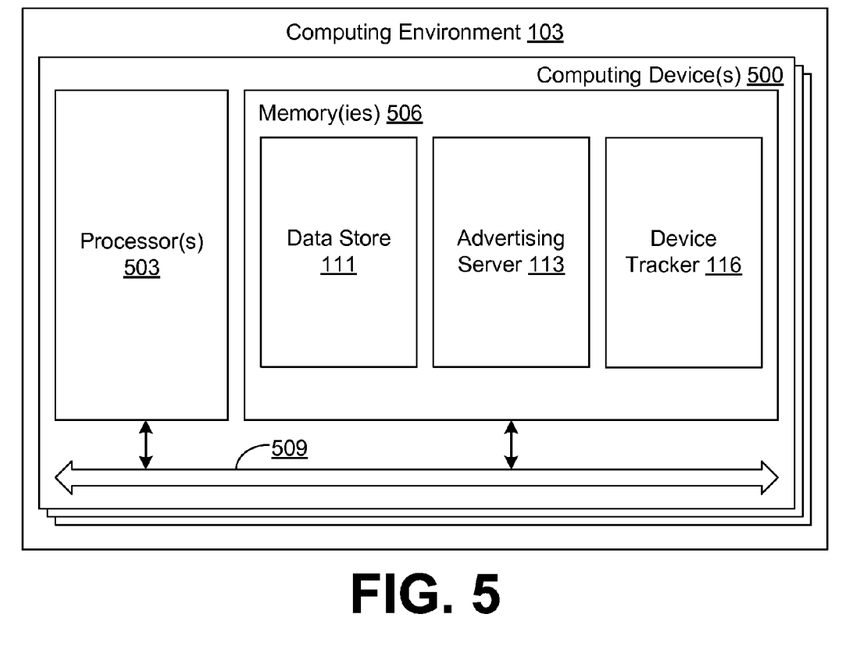
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the advertising serve 113, the device tracker 116, and potentially other applications. Also stored in the memory 506 may be a data store 111 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content server 113, the device tracker 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the device tracker 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content server 113 and the device tracker 116, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising a set of instructions that, when executed by a processor of the computing device, cause the computing device to at least:

analyze a first request for network content received from a browser application executing on a client device to determine that the first request is unassociated with a user account, wherein the first request comprises a persistent device identifier for the client device;

compare the persistent device identifier to a list of device identifiers associated with the user account to determine that the persistent device identifier is unassociated with the user account;

store the persistent device identifier;

analyze a second request for network content received from a separate application executing on the client device to determine that the second request is associated with the user account, wherein the second request for network content includes an identifier for the user account and the persistent device identifier;

store the persistent device identifier in the list of device identifiers to associate the stored persistent device identifier of the client device with the user account in response to a determination that the second request is associated with the user account; and send the association between the stored persistent device identifier and the user account to a content server in response to the determination that the second request is associated with the user account.

2. The non-transitory computer-readable medium of claim 1, wherein the program further comprises instructions that, when executed by the processor of the computing device, cause the computing device to at least:

analyze a plurality of persistent device identifiers, wherein each of the plurality of persistent device identifiers is associated with a plurality of user accounts; and for each of the plurality of user accounts, remove each association with each of the plurality of user accounts except for a most recent association between the persistent device identifier and one of the plurality of user accounts.

3. The non-transitory computer-readable medium of claim 1, wherein the instructions that cause the computing device to at least analyze the second request for network content from the client device to determine that the second request is associated with the user account further cause the computing device to identify an account identifier for the user account included in the second request for network content.

4. A system, comprising:
at least one computing device comprising a processor and a memory; and
an application executable in the at least one computing device, the application comprising a set of instructions stored in the memory and executable by the processor, wherein the set of instructions, when executed by the processor, cause the at least one computing device to at least:
analyze a first request for network content received from a browser application executing on a client device to determine if the first request is associated with a user account, wherein the first request comprises a first persistent device identifier;
in response to a determination that the first request is unassociated with the user account, analyze the first request to identify the first persistent device identifier;
compare the first persistent device identifier to a list of persistent device identifiers linked to the user account to determine that the first persistent device identifier is unassociated with the user account;

store the first persistent device identifier;
determine that a second request for network content received from a separate application executing on the client device is associated with the user account, wherein the second request for network content contains the first persistent device identifier that is included in the list of persistent device identifiers linked to the user account; and
associate the stored first persistent device identifier with the user account in response to a determination that the second request for the network content is associated with the user account.

5. The system of claim 4, wherein the application further comprises instructions that, when executed by the processor, cause the computing device to send the association between the first persistent device identifier and the user account to a content server.

6. The system of claim 4, wherein the application further comprises instructions that, when executed by the processor, cause the computing device to:
analyze a plurality of persistent device identifiers, wherein each of the plurality of persistent device identifiers is associated with a plurality of user accounts; and
for each of the plurality of user accounts, remove each association with each of the plurality of user accounts except for a most recent association between the first persistent device identifier and one of the plurality of user accounts.

7. The system of claim 4, wherein the client device comprises at least one of a desktop personal computer (PC), a laptop PC, a personal digital assistant (PDA), a smartphone, or a tablet computer.

8. The system of claim 4, wherein the instructions that cause the computing device to at least determine that the second request for network content from the client device is associated with the user account cause the computing device to at least identify an account identifier for the user account included in the second request for network content.

9. The system of claim 8, wherein the account identifier comprises at least one of a username or a cookie.

10. The system of claim 4, wherein either the first persistent device identifier or the second persistent device identifier comprises a cookie.

11. The system of claim 4, wherein either the first persistent device identifier or the second persistent device identifier comprises a serial number of the client device.

12. A computer implemented method, comprising:
comparing, via a computing device, a first persistent device identifier included with a first request for network content, wherein the first request is generated by a first application executing on a device, with a list of device identifiers associated with a user account to determine that the device is unassociated with the user account;
storing, via the computing device, the first persistent device identifier in response to determining that the first persistent device identifier fails to match any of the device identifiers in the list of device identifiers;
determining, via the computing device, that a second request for network content received from a second application executing on the device is associated with the user account based at least in part on a presence of a second persistent device identifier in the second request for network content, wherein:
the second request for network content includes the first persistent device identifier; and the second persistent device identifier has been previously associated with the user account; and including, via the computing device, the stored first persistent device identifier in the list of device identifiers associated with the user account in response to determining that the second request for network content is associated with the user account.

13. The computer implemented method of claim 12, wherein either the first persistent device identifier or the second persistent device identifier is unique across a plurality of devices.

14. The computer implemented method of claim 12, wherein the first application corresponds to a native network browser executing in the device.

15. The computer implemented method of claim 12, further comprising:
   determining, via the computing device, a set of persistent device identifiers wherein each persistent device identifier is associated with a plurality of user accounts; and
   removing, via the computing device, an oldest association between each persistent device identifier and at least one of the plurality of user accounts.

16. The computer implemented method of claim 12, wherein either the first persistent device identifier or the second persistent device identifier comprises at least one of a media access control (MAC) address, a cookie, or a serial number.

17. The computer implemented method of claim 12, wherein determining that the second request for network content from the device is associated with the user account further comprises identifying, via the computing device, that an account identifier for the user account is included in the second request for network content.

18. The computer implemented method of claim 17, wherein the account identifier comprises a user name.

19. The computer implemented method of claim 17, wherein the account identifier comprises a cookie.

20. The computer implemented method of claim 17, wherein the account identifier comprises a user identification number.

* * * * *